(12) United States Patent
Sayres (10) Patent No.: US 9,071,041 B2
(45) Date of Patent: *Jun. 30, 2015

(54) TWIST-IN LATCHING ARRANGEMENT FOR CABLE MANAGEMENT STRUCTURE

(71) Applicant: ADC Telecommunications, Inc., Eden Prairie, MN (US)

(72) Inventor: Derek Sayres, Lonsdale, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 76 days.

This patent is subject to a terminal disclaimer.

(21) Appl. No.: 13/724,787

(22) Filed: Dec. 21, 2012

(65) Prior Publication Data

US 2013/0118776 A1 May 16, 2013

Related U.S. Application Data

(63) Continuation of application No. 12/834,964, filed on Jul. 13, 2010, now Pat. No. 8,344,247.

(60) Provisional application No. 61/225,808, filed on Jul. 15, 2009.

(51) Int. Cl.
   *H02G 3/08* (2006.01)
   *H02G 3/02* (2006.01)
   *H02G 3/04* (2006.01)
   *H02G 3/32* (2006.01)

(52) U.S. Cl.
   CPC .............. *H02G 3/02* (2013.01); *Y10T 29/49826* (2015.01); *H02G 3/045* (2013.01); *H02G 3/32* (2013.01)

(58) Field of Classification Search
   USPC ............. 174/50, 58, 72 A; 439/535; 248/906; 385/134, 135
   See application file for complete search history.

(56) References Cited

U.S. PATENT DOCUMENTS 3,890,459 A   6/1975  Caveney
4,136,257 A   1/1979  Taylor
(Continued)

FOREIGN PATENT DOCUMENTS

DE   201 15 027 UI   3/2003

OTHER PUBLICATIONS

International Search Report and Written Opinion mailed Nov. 7, 2011.

(Continued)

*Primary Examiner* — Dhirubhai R Patel
(74) *Attorney, Agent, or Firm* — Merchant & Gould P.C.

(57) ABSTRACT

A cable management system includes a panel with a plurality of openings, each opening defining a similar configuration, each opening defining a first dimension and a second dimension, the first dimension being longer, than the second dimension. A cable management structure is removably coupled to the panel, the cable management structure including a plurality of latching elements, each latching element defining a retaining portion received through each opening of the panel, each retaining portion having a first dimension that is smaller than or equal to the second dimension of the opening and a second dimension that is greater than the second dimension of the opening, wherein the cable management structure is coupled to the panel by inserting the retaining portion of each latching element through each opening and rotating the cable management structure in a first direction with respect to the panel.

8 Claims, 5 Drawing Sheets

(56) References Cited

U.S. PATENT DOCUMENTS

| | | | |
|---|---|---|---|
| 4,527,760 | A | 7/1985 | Salacuse |
| 4,619,428 | A * | 10/1986 | Bailey .................. 248/220.43 |
| 5,067,678 | A | 11/1991 | Henneberger |
| 5,316,243 | A | 5/1994 | Henneberger |
| 5,752,781 | A | 5/1998 | Haataja |
| 5,898,134 | A | 4/1999 | Fallin |
| 6,044,194 | A | 3/2000 | Meyerhoefer |
| 6,437,243 | B1 | 8/2002 | VanderVelde et al. |
| 6,468,112 | B1 | 10/2002 | Follingstad et al. |
| 6,708,918 | B2 | 3/2004 | Ferris et al. |
| 6,766,093 | B2 | 7/2004 | McGrath et al. |
| 6,835,891 | B1 | 12/2004 | Herzog et al. |
| 6,916,986 | B1 | 7/2005 | Herzog et al. |
| 6,918,796 | B2 | 7/2005 | Elliot et al. |
| 6,964,588 | B2 | 11/2005 | Follingstad et al. |
| 7,060,901 | B2 | 6/2006 | Herzog et al. |
| 7,083,051 | B2 | 8/2006 | Smith et al. |
| 7,220,150 | B2 | 5/2007 | Follingstad et al. |
| 7,285,027 | B2 | 10/2007 | McGrath et al. |
| 7,298,951 | B2 | 11/2007 | Smrha et al. |
| 7,315,680 | B1 | 1/2008 | Rapp et al. |
| 7,326,863 | B2 | 2/2008 | Herzog |
| 7,331,473 | B2 | 2/2008 | Smith et al. |
| 7,369,740 | B2 | 5/2008 | Tinucci |
| 7,381,100 | B2 | 6/2008 | Follingstad et al. |
| 7,411,126 | B2 | 8/2008 | Herzog et al. |
| 7,458,859 | B2 | 12/2008 | McGrath et al. |
| 7,513,374 | B2 | 4/2009 | Smith et al. |
| 7,612,300 | B2 | 11/2009 | Owens et al. |
| 7,677,400 | B2 | 3/2010 | Bayazit et al. |
| 7,748,541 | B2 | 7/2010 | Smith et al. |
| 7,764,857 | B2 * | 7/2010 | Sjodin ........................ 385/135 |
| 7,869,683 | B2 | 1/2011 | Barnes et al. |
| 7,952,027 | B2 * | 5/2011 | Grelck ........................ 174/72 A |
| 8,079,561 | B2 * | 12/2011 | Jafari ........................ 248/231.81 |
| 2006/0228087 | A1 | 10/2006 | Bayazit et al. |
| 2008/0050084 | A1 | 2/2008 | Sjodin |
| 2008/0185483 | A1 | 8/2008 | Rapp et al. |
| 2009/0032280 | A1 | 2/2009 | Owens et al. |
| 2009/0091909 | A1 | 4/2009 | Follingstad |
| 2009/0093169 | A1 | 4/2009 | McGrath |
| 2009/0223909 | A1 | 9/2009 | Smith |
| 2010/0193450 | A1 | 8/2010 | Bayazit et al. |
| 2010/0263902 | A1 | 10/2010 | Jacobson et al. |
| 2010/0266256 | A1 | 10/2010 | Sayres |
| 2010/0314340 | A1 | 12/2010 | Smith et al. |

OTHER PUBLICATIONS

Panduit, 5" Wire Retainer, Part No. WR5, Copyright 1998, 1 page.
Panduit, FWR-C, Copyright 1995-2009, 1 page.
Panduit, Solid Wall Duct Wire Retainer Drawing #36402-11, Sep. 17, 2001, 1 page.
Panduit, WR2-C, Copyright 1995-2009, 1 page.
Panduit, WR5-C, Copyright 1995-2009, 1 page.
Panduit, Wiring Duct SA-WDCB05 (replaces SA101N64D-LP), accessed Apr. 15, 2009, 76 pages.
Panduit, Panduct Hinged Cover Wiring Duct, Copyright 2007, 4 pages.
Panduit, Wire Retainer for U.S. slotted "F" Duct Drawing #34518-34, Jan. 21, 1994, 1 page.
Panduit, Wiring Duct and Cable Management Wire Retainer Drawing #35541-63, Mar. 13, 1997, 1 page.
Panduit, F-Duct Wire Retainer, Copyright 2000, 2 pages.
Panduit, Wiring Duct and Cable Management Wire Retainer (WR2), Drawing #35541-60, Mar. 13, 1997, 1 page.
Panduit, Solid Wall Duct Wire Retainer (WRS-A), Sep. 17, 2001, 1 page.
Panduit, Panduct® Solid Wall Raceway Type FS and Type D Wiring Duct Wire Retainer (WRS-A-C10), Copyright 1995-2009, 1 page.
U.S. Appl. No. 61/212,920, filed Apr. 16, 2009 entitled "Cable Management Arrangement With Finger Sets".

* cited by examiner

TWIST-IN LATCHING ARRANGEMENT FOR CABLE MANAGEMENT STRUCTURE

CROSS REFERENCE TO RELATED APPLICATION

This application is a continuation of application Ser. No. 12/834,964, filed Jul. 13, 2010, now U.S. Pat. No. 8,344,247, which application claims the benefit of U.S. provisional application Ser. No. 61/225,808, filed Jul. 15, 2009, which applications are incorporated herein by reference in their entirety.

FIELD OF THE TECHNOLOGY

The present disclosure relates generally to devices for use in the telecommunications industry, and various methods associated with such devices. More particularly, this disclosure relates to devices used in the management of cables, and various methods associated with cable management.

BACKGROUND

Telecommunication systems utilize fiber optic cables and/or copper cables to interconnect pieces of telecommunications equipment. The pieces of equipment are often mounted to telecommunication racks, cabinets, or other framework structures. Because of the large number of cables associated with such systems, effective cable management is crucial. Ease of cable organization and cable management adaptation are factors related to effective cable management. When routing optical fibers and other cables such as copper wires, it is desirable that a routing system will be readily modifiable and adaptable to changes in equipment needs.

Certain types of cable management systems may be located between adjacent first and second telecommunications racks, wherein the telecommunications racks are configured to receive a variety of telecommunications components. Examples of such telecommunications racks to which cable management systems can be mounted are described in U.S. Pat. No. 7,083,051; U.S. Patent Application Publication Nos. 2008/0050084; 2006/0228087; and U.S. Provisional Application Ser. No. 61/212,920, entitled CABLE MANAGEMENT ARRANGEMENT WITH FINGER SETS, filed Apr. 16, 2009, which are all incorporated herein by reference in their entireties.

Other cable management/routing systems may include components, such as trough members and couplers, for defining the cable routing paths. Such trough members may be joined together by couplings. U.S. Pat. Nos. 5,067,678; 5,316,243; 5,752,781; U.S. Patent Application Publication No. 2009/0032280; and U.S. Provisional Application Ser. No. 61/170,857, entitled OFFSET SLOTTING FOR CABLE TROUGH MEMBER, filed Apr. 20, 2009 (now U.S. application Ser. No. 12/763,262, filed Apr. 20, 2010), describe cable routing systems that include a plurality of trough members and couplers, which are all incorporated herein by reference in their entireties.

In general, conventional arrangements for managing cables can be improved.

SUMMARY

On aspect of the present disclosure relates to a cable management system comprising a panel including a plurality of openings, each opening defining a similar configuration, each opening defining a first dimension and a second dimension, the first dimension being longer than the second dimension. A cable management structure is configured to be removably coupled to the panel, the cable management structure including a plurality of latching elements, each latching element defining a retaining portion configured to be received through each opening of the panel, each retaining portion having a first dimension that is smaller than or equal to the second dimension of the opening and a second dimension that is greater than the second dimension of the opening. The cable management structure is coupled to the panel by inserting the retaining portion of each latching element through each opening and rotating the cable management structure in a first direction with respect to the panel.

Another aspect of the present disclosure relates to a cable management system comprising a cable trough member defining length with a first end and a second end, the cable trough including a base portion, first and second sidewalls extending from the base portion to form a U-shaped trough having an open end and a closed end. The cable trough includes a plurality of slots formed along each of the first and second sidewalls, the slots formed by leg portions of the first and second sidewalls, the base portion including at least one opening. A cable management structure is configured to be removable coupled to the base portion of the cable trough member, the cable management structure including a base wall, a first cable management finger extending from the base wall toward the open end of the cable through and a second cable management finger extending from the base wall toward the open end of the cable trough, wherein the first cable management finger is offset with respect to the second cable management finger in a direction along the length of the trough member. The cable management structure includes a latching element extending from the base wall toward the closed end of the trough, the latching element configured to be received through the opening, whereby the cable management structure is coupled to the panel by inserting the latching element through the opening and rotating the cable management structure in a first direction with respect to the panel.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

FIGS. 1-4 illustrate a telecommunications system 10 including a cable management system 20 in accordance with the principles disclosed. The cable management system 20 shown includes a cable trough member 22 and at least one cable management finger structure 24 mounted to the cable trough member 22.

Generally, trough members such as the one shown in FIGS. 1-4 include a plurality of slots 26 formed in the sidewalls 28, 30 of the trough members. These slots 26 extend along the sidewalls 28, 30 from a first end 32 to a second open end 34.

As used herein, the phrase "trough member" is used to refer to any trough, fitting, railway, raceway, or similarly configured component including any number of ends. In example embodiments, the trough members 22 can be positioned to extend vertically or horizontally.

The example trough member 22 shown in FIGS. 1-4 includes first and second sidewalls 28, 30 coupled to a third wall 36 (i.e., base portion or a bottom wall) generally forming a U-shaped trough with an interior space 38 through which cables such as fiber optic cables can be run.

The trough member 22 may extend lengthwise in a vertical or horizontal direction when in use. The trough member 22 extends from a first end 40 to a second end 42. The trough member 22 can be of varying lengths and widths, and can be coupled to other trough members or similar structures to form a cable routing system. Although in FIGS. 1-4, a 2"×2" (H×W) trough member is illustrated, in other embodiments, the trough members may be 2"×4", 4"×4", 4"×2", or of other dimensions.

As shown in FIGS. 1-4, adjacent the free ends 34 of each of the sidewalls 28, 30 are hinge portions 44. In example embodiments, the hinge portions 44 are used to allow a cover to be coupled to the trough member 22. In one example, the cover can be coupled to the hinge portions 44 and can be moved between closed and open positions. Additional details regarding one example cover that can be used with the trough member 22 is described in U.S. Patent Application Publication No. 2009/0032280, the entirety of which has been incorporated herein by reference. In other configurations, the hinge portions 44 and related cover are optional and need not be provided on the trough member 22.

In the example shown, the trough member 22 includes a plurality of slots 26 formed in the sidewalls 28, 30. The slots 26 are defined by leg portions 48 of the sidewalls 28, 30. The legs 48 define the hinge portions 44 discussed above. The slots 26 are sized to allow cables to enter or exit the interior space 38 of the trough member 22 through the slots 26. In the examples shown, the slots 26 are formed at periodic intervals along the sidewalls 28, 30. Other configurations are possible.

The third wall 36 of the trough member 22 that cooperates with the first and second sidewalls 28, 30 to form the U-shape of the trough includes a plurality of openings 50. According to one embodiment, the openings 50 may be used as fastener openings for receiving fasteners for mounting various types of structures such as brackets to the trough member 22. In the embodiment of the cable management system 20 shown, the openings 50 of the trough 22 are used for coupling cable management finger structures 24 to the trough member 22 as will be explained in further detail below.

Referring to FIGS. 1-4, in the embodiment shown, the openings 50 are provided in sets of three. The sets are provided at periodic intervals along the third sidewall 36. Other number of openings or other arrangements are possible. In the embodiment shown, the openings 50 are generally elongate, having a first dimension D1 that is longer than a second dimension D2. In the illustrated embodiment, all of the openings 50 are of a similar shape.

Still referring to FIGS. 1-4, the cable management system 20 includes at least one cable management finger structure 24 coupled to the openings 50 on the third sidewall 36.

It should be noted that the cable management system 20 including the trough member 22 shown in FIGS. 1-4 is simply one example system on which the principles of the present disclosure may be utilized. The coupling arrangement between the trough member 22 and the cable management finger structure 24 may be utilized on other cable management/routing systems having structures such as mounting plates (e.g., back planes or panels) that are mounted along a side of a telecommunications frame or between adjacent first and second telecommunications frames. In alternative embodiments, the coupling arrangement may be used with other cable management systems, such as those in a cabinet or a rack, to manage and organize cables.

The shown trough 22 and cable management finger structure 24 are example embodiments used to describe and illustrate the inventive aspects of the coupling arrangement for the cable management system 20 and should not be used to limit the inventive aspects.

Now referring to FIGS. 5-13, one of the cable management finger structures 24 is shown in isolation. In the embodiment shown, the cable management finger structure 24 includes a base wall 52 extending from a first end 54 to a second end 56. The base wall 52 defines a front side 58 and a rear side 60. A first finger 62 extends from the front side 58, adjacent the first end 54 of the base wall 52. A second finger 64 extends from the front side 58, adjacent the second end 56 of the base wall 52. The first finger 62 includes a first connection portion 66 that connects a first retention portion 68 to the base wall 52. The second finger 64 includes a second connection portion 70 that connects a second retention portion 72 to the base wall 52. The first and second retention portions 68, 72 of the fingers 62, 64 are disposed parallel to the base wall 52 while the first and second connection portions 66, 70 define planes P disposed perpendicular to the base wall 52.

As shown, the first retention portion 68 of the first finger 62 and the second retention portion 72 of the second finger 64 provide a vertical gap G therebetween for inserting and removing cables. Also, the second connection portion 70 includes an S-shaped configuration to provide a horizontal offset to the second finger 64 with respect to the first finger 62.

Figure 1:
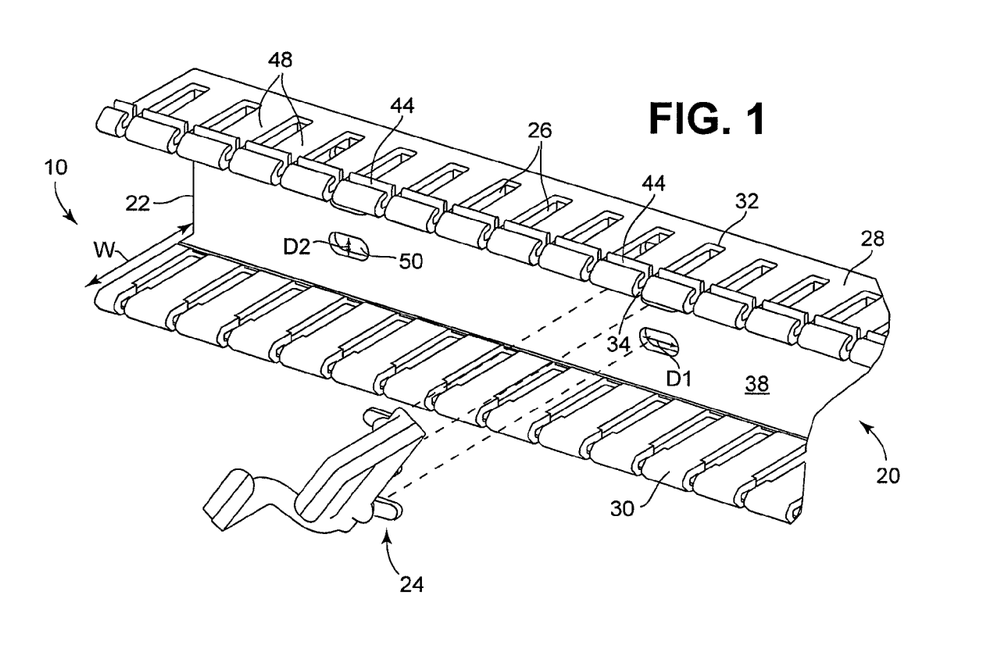
FIG. 1 is top front perspective view of a telecommunications cable management system including a trough member and at least one cable management finger structure shown in an exploded configuration, the telecommunications cable management system having features that are examples of inventive aspects in accordance with the principles of the present disclosure.
Figure 2:
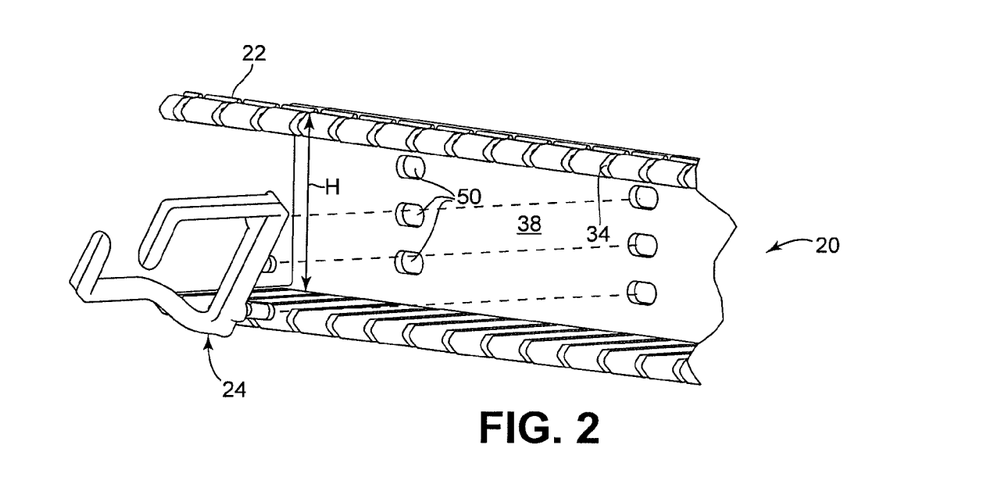
FIG. 2 is another top front perspective view of the cable management system of FIG. 1.
Figure 3:
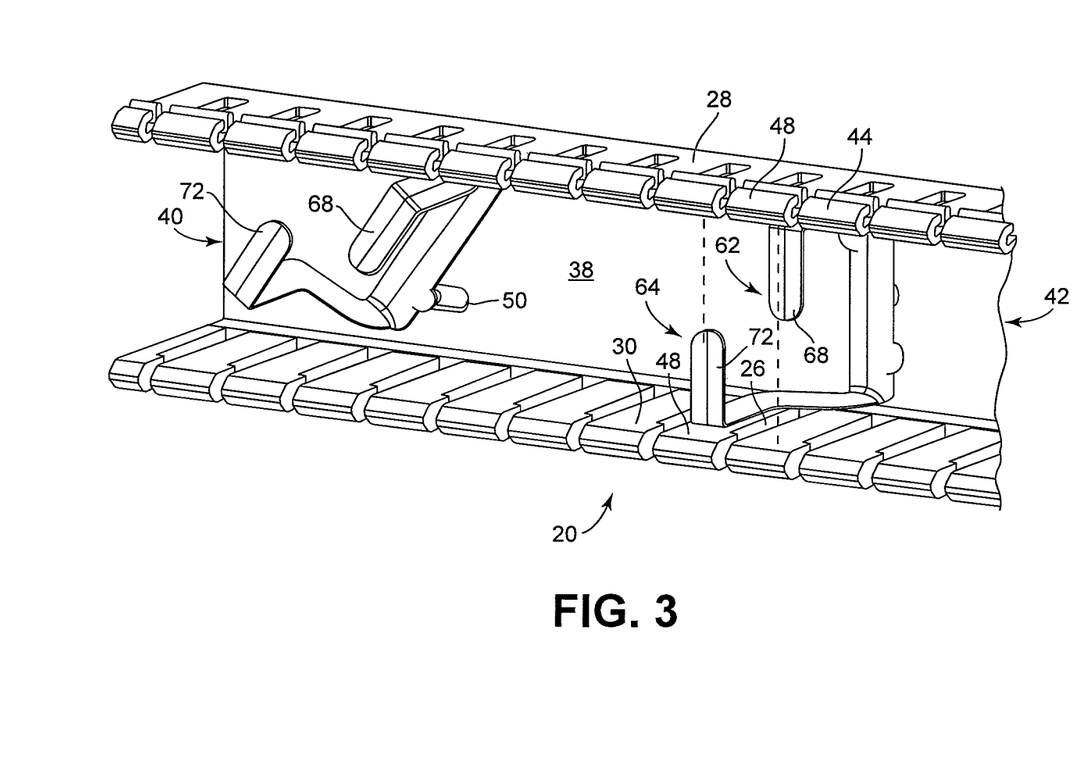
FIG. 3 illustrates a top front perspective view of the cable management system of FIG. 1 with a first cable management finger structure fully coupled to the trough and a second cable management finger structure partially inserted to openings at the rear wall of the trough.
Figure 4:
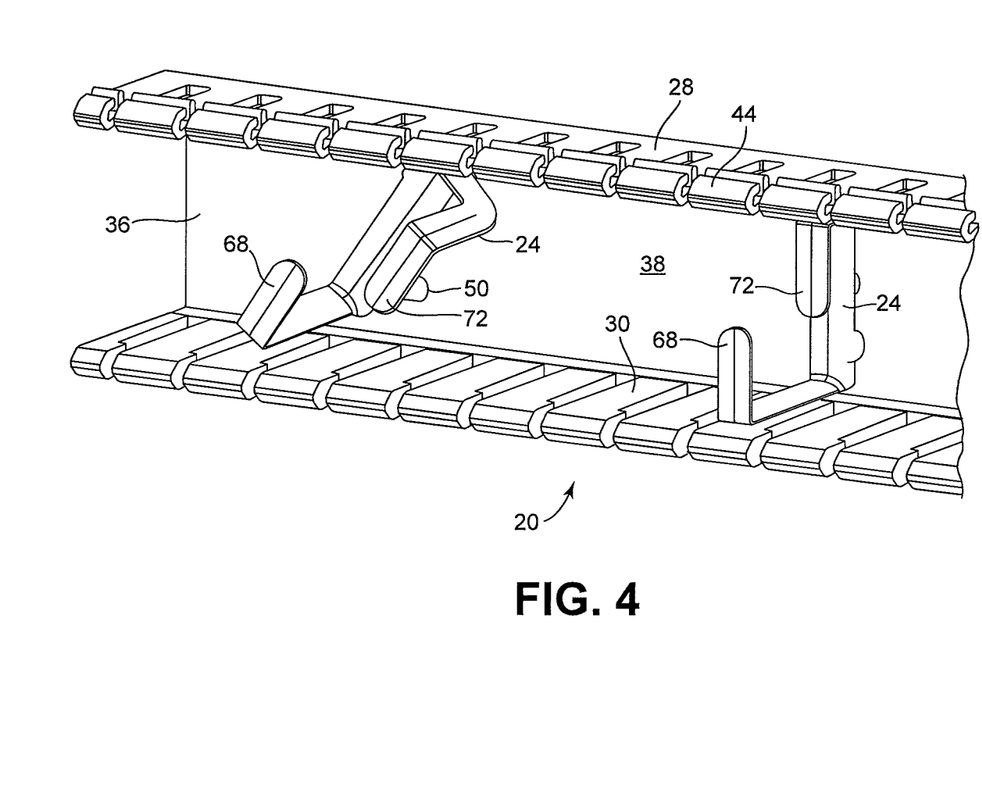
FIG. 4 illustrates the cable management system of FIG. 3 from a bottom front perspective view.
Figure 5:
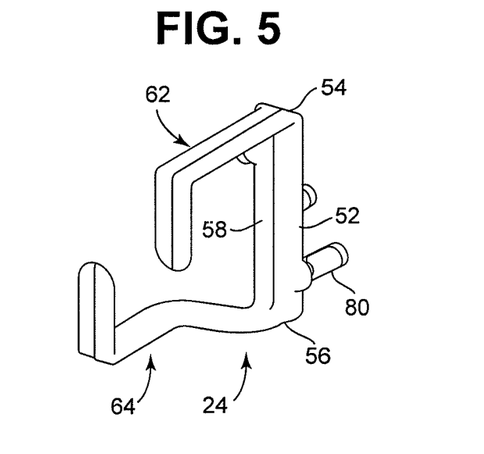
FIG. 5 is a top front perspective view of one of the cable management finger structures shown in FIGS. 1-4.
Figure 6:
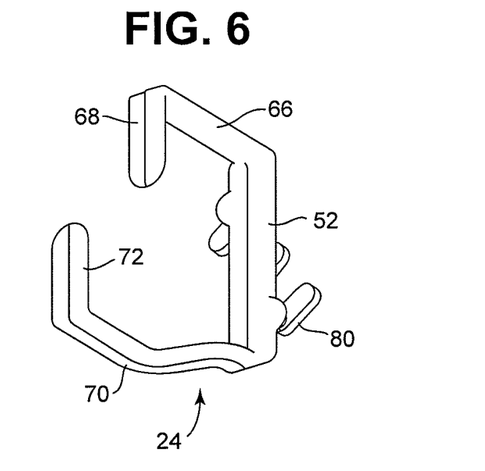
FIG. 6 is a bottom front perspective view of the cable management finger structure of FIG. 5.
Figure 7:
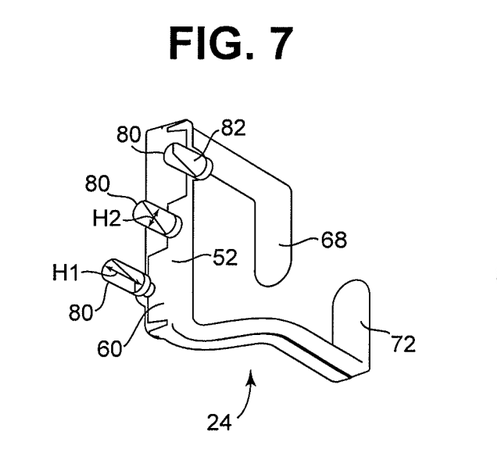
FIG. 7 is a bottom rear perspective view of the cable management finger structure of FIG. 5.
Figure 8:
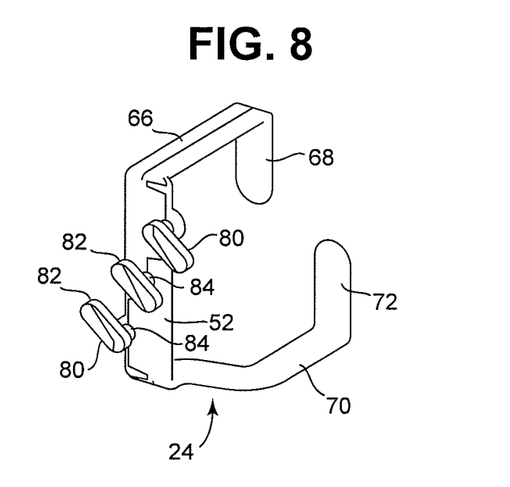
FIG. 8 is a top rear perspective view of the cable management finger structure of FIG. 5.
Figure 9:
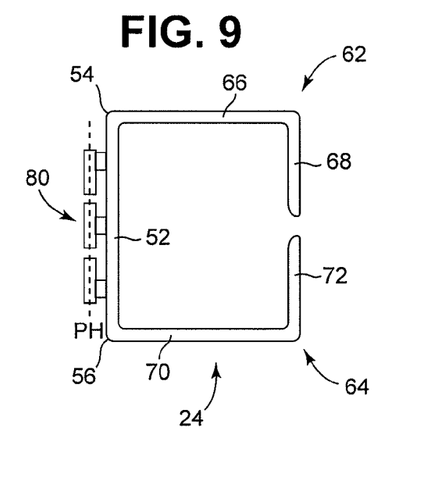
FIG. 9 is a left side view of the cable management finger structure of FIG. 5.
Figure 10:
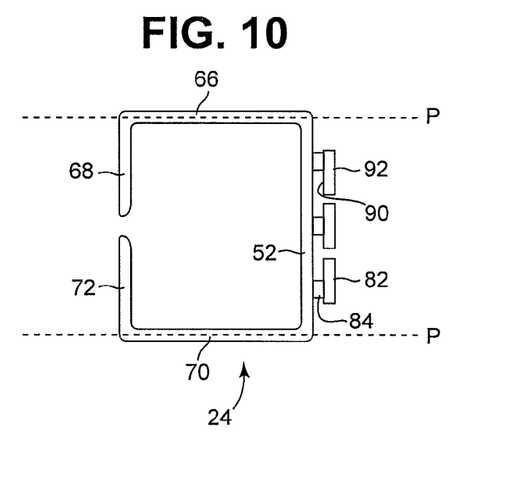
FIG. 10 is a right side view of the cable management finger structure of FIG. 5.
Figure 11:
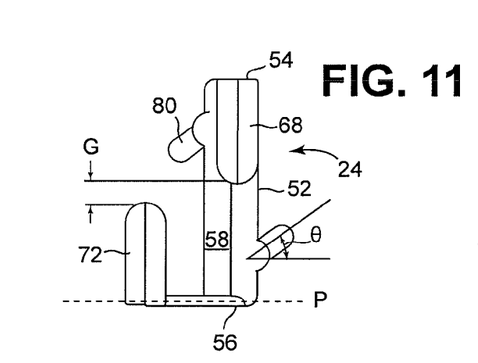
FIG. 11 front elevational view of the cable management finger structure of FIG. 5.

As shown in FIGS. 3 and 4, once the cable management finger structure 24 is coupled to the trough member 22, the provided off-set positions the first retention portion 68 of the first finger 62 on one of the legs 48 of the first sidewall 28 and the second retention portion 72 of the second finger 64 on a horizontally offset leg 48 on the opposing second sidewall 30 of the trough. As shown in FIGS. 3 and 4, when the cable management finger structure 24 is coupled to the trough 22, the first connection portion 66 aligns the first retention portion 68 of the first finger 62 with a leg 48 on the first sidewall 28. The second connection portion 70 is S-shaped so as to align the second retention portion 72 of the second finger 64 with a horizontally offset leg 48 on the second sidewall 30. The S-shaped structure of the second connection portion 70 is designed to avoid the slots 26 between the legs 48. In this manner, the first and second fingers 62, 64 do not interfere with the slots 26 defined at the first and second sidewalls 28, 30 and cables can freely enter and exit the slots 26 without interference from the fingers 62, 64.

Still referring to FIGS. 5-13, the cable management finger structure 24 include a plurality of latching elements or portions 80 extending from the rear side 60 of the base wall 52. In the embodiment shown, three latching portions 80 are shown. Each latching portion 80 includes a head portion 82 (i.e., retaining portion) and a neck portion 84. The head portion 82 is generally of a larger dimension that the neck portion 84. Further, the head portions 82 are generally shaped to match the configuration of the openings 50 provided on the third wall 36 of the trough 22 such that the head portions 82 also include a first dimension H1 that is longer than a second dimension H2. In the illustrated embodiment, all of the head portions 82 are similar in shape.

In the illustrated example, the head portions 82 are provided at an acute angle θ to the planes P formed by the first and second connection portions 66, 70. The three head portions 82 are all provided at the same angle θ and are parallel to each other. In one example embodiment, the angle θ formed by the head portions are about 35 degrees with respect to the planes P formed by the first and second connection portions 66, 70 of the fingers 62, 64. As will be described in further detail below, this angle θ can be varied between 0 and 90 degrees depending upon the configuration of the cable management finger structure 24 and the shape of the trough member 22.

Still referring to FIGS. 5-13, the head portions 82 define planes PH that are parallel to the base wall 52. The head portions 82 are arranged such that when the cable management finger structure 24 is tilted clockwise 35 degrees with respect to the first and second sidewalls 28, 30 of the trough member 22, the head portions 82 align with the openings 50 provided on the third wall 36 of the trough member 22. Once the head portions 82 are aligned with the openings 50, the head portions 82 are inserted through the openings 50 on the third wall 36. Once inserted, the cable management finger structure 24 can be twisted in a counter-clockwise direction to capture the head portions 82 behind the third wall 36 in coupling the cable management finger structure 24 to the trough member 22.

The neck portions 84 are sized small enough to allow twisting or rotation of the latching portions 80 of the cable management finger structures 24 once the head portions 82 have been inserted through the openings 50. As discussed above, since each head portion 82 is designed to match the shape of the opening 50, each head portion 82 defines a first dimension H1 that is longer than a second dimension H2. Once the head portions 82 are aligned with and inserted through the openings 50, by rotating or twisting the cable management finger structure 24, the longer dimension H1 of the head portion 82 gets positioned behind the third wall 36 and extends further than the shorter dimension D2 of the opening 50 to capture the latching portion 80 with respect to the opening 50. In this manner, the cable management finger structure 24 is coupled to the trough member 22.

Figure 12:
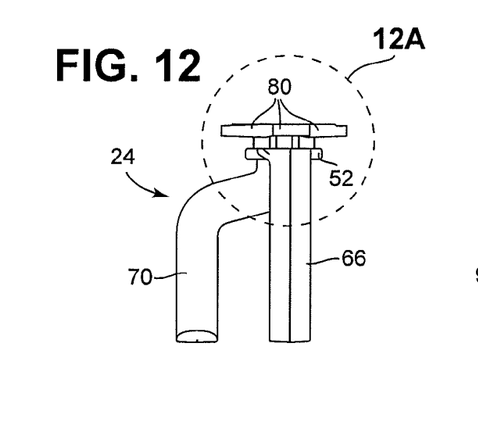
FIG. 12 is a top plan view of the cable management finger structure of FIG. 5.
Figure 12A:
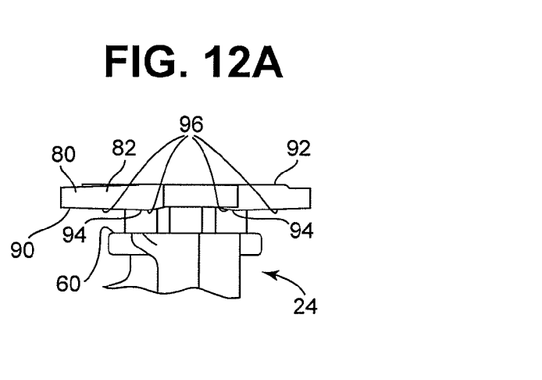
FIG. 12A is a close-up view of the latching portions of the cable management finger structure of FIG. 12.
Figure 13:
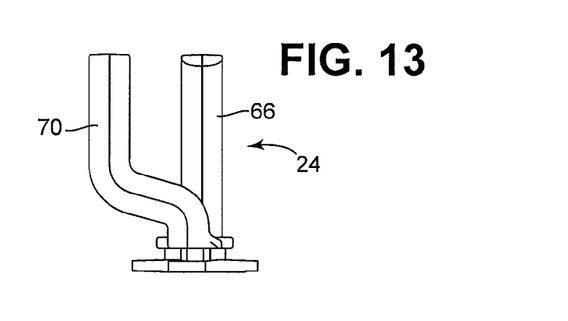
FIG. 13 is a bottom plan view of the cable management finger structure of FIG. 5.

As shown in FIG. 12A, the head portions 82 define a front face 90 directed toward the base wall 52 and a rear face 92 opposite the front face 90. In certain embodiments, the front face 90 of the head portion 82 may define a raised surface 94 formed by two ramped portions 96 that come together. The raised surface 94 is configured to provide a frictional fit with the rear side of the third wall 36 of the trough member 22 once the cable management finger structure 24 is rotated/twisted during coupling. It should be noted that the front face 90 of the head portion 82 may include other raised surface structures or textures to provide a frictional fit with the rear side of the third wall 36 once the head portion 82 has been inserted through the openings 50 and the cable management finger structure 24 is twisted into a latched orientation. In certain embodiments, the raised surface 94 may be provided adjacent an edge of the head portion 82 that is away from the twisting direction so that the cable management finger structure 24 gets tightened to the trough 22 as it is twisted. In other embodiments, the surface of the front face 90 of the head portion 82 may ramp up toward the edge of the head portion 82 that is away from the twisting direction to provide a similar tightening effect.

Once the cable management finger structures 24 are twisted into a latched configuration, the first and second retention portions 68, 72 of the first and second fingers 62, 64 end up perpendicular to the first and second sidewalls 28, 30 of the trough 22 and the first and second connection portions 66, 70 end up adjacent and parallel to the first and second sidewalls 28, 30.

Although in the illustrated embodiment, the trough member 22 includes sets of three openings 50 on the third wall 36 and the cable management finger structures 24 include three latching portions 80 configured to align with the three openings 50, less or more than three may be provided on the trough member 22 and/or the cable management finger structures 24.

It should also be noted that although the openings 50 on the trough member 22 are generally elongate and the longer dimensions D1 are oriented parallel to the first and second sidewalls 28, 30, the openings 50 and also the head portions 82 of the latching members 80 may be oriented at different angles as long as the cable management finger structures 24 are able to be coupled to the trough member 22 by insertion and rotation.

It should also be noted that, even though in the depicted embodiment, the cable management finger structures 24 are latched into place by twisting the cable management finger structures 24 in a counter-clockwise direction, depending upon the configuration of the cable management finger structures 24 and the trough members 22, the head portions 82 of the latching portions 80 can be positioned and angled such that the cable management finger structures 24 are latched into place by twisting in the clockwise direction.

In the illustrated embodiment, the cable management finger structures 24 are sized to fit within the interior space 38 of the U-shaped trough 22 such that a cover can be used with the trough 22. In other embodiments, the sizes of the cable management finger structures 24 may vary.

As discussed above, the trough member 22 can be of varying lengths and widths. In FIGS. 1-4, a 2"×2" (H×W) trough member 22 is illustrated and the shown cable management finger structures 24 are sized to fit within the trough member 22. In other embodiments, wherein the trough members 22 may be 2"×4", 4"×4", 4"×2", or of other dimensions, the cable management finger structures 24 may be sized differently to fit within the trough members 22. For example, in deeper trough members 22, the connection portions 66, 70 of the fingers 62, 64 may be longer. In wider trough members 22, the base wall 52 and/or the retention portions 68, 72 of the fingers 62, 64 may be longer.

The above specification provides a complete description of the present inventive aspects. Since many embodiments can be made without departing from the spirit and scope of the inventive aspects, certain aspects reside in the claims hereinafter appended.

What is claimed is:

1. A cable management system comprising:
a cable trough member defining length with a first end and a second end, the cable trough including a bottom wall, first and second sidewalls extending from the bottom wall to form a U-shaped trough having an open end and a closed end, the bottom wall including at least one opening; a cable management structure configured to be removably coupled to the bottom wall of the cable trough member, the cable management structure including a base wall, a first cable management finger extending from the base wall toward the open end of the cable trough, and a latching element extending from the base wall toward the closed end of the trough, the latching element configured to be received through the opening, whereby the cable management structure is coupled to the bottom wall of the cable trough member by inserting the latching element through the opening and rotating the cable management structure in a first direction with respect to the bottom wall.

2. A cable management system according to claim 1, wherein the first cable management finger includes a retention portion and a connection portion that connects the retention portion to the base wall, the connection portion defining a plane parallel to the first and second sidewalls of the cable trough and the retention portion being perpendicular to the connection portion.

3. A cable management system according to claim 1, wherein the bottom wall of the cable trough includes a plurality of similarly shaped openings, and the cable management structure includes a plurality of latching elements extending from the base wall toward the closed end of the trough configured to mate with the openings.

4. A cable management system according to claim 1, further including a plurality of cable management structures removably coupled to the bottom wall of the cable trough.

5. A cable management structure comprising
a base wall defining a length, a width, a front face, a rear face, and a first cable management finger extending from the front face of the base wall, the first cable management finger including a first retention portion and a first connection portion that connects the first retention portion to the base wall, the first connection portion extending transversely from the base wall and defining a plane perpendicular to the base wall and the first retention portion being generally perpendicular to the connection portion; and
a plurality of latching elements extending away from the rear face of the base wall, each latching element defining a neck portion and a head portion, the head portion having a first dimension and a second dimension, the first dimension being longer than the second dimension, each head portion being oriented at an acute angle with respect to the plane defined by the first connection portion of the first cable management finger and each head portion being parallel to each other along the first dimension.

6. A cable management structure according to claim 5, further comprising three latching elements, each defining a neck portion and a head portion, wherein all of the head portions are similarly shaped.

7. A cable management structure according to claim 5, wherein each head portion defines a front face directed toward the neck portion and a rear face, the front face having a raised surface on at least a portion of the front face.

8. A cable management structure according to claim 7, wherein the front face has a raised surface on less than an entirety of the front face.

* * * * *